US009095228B2

(12) United States Patent
Gooris (10) Patent No.: US 9,095,228 B2
(45) Date of Patent: Aug. 4, 2015

(54) CONTAINING STRUCTURE FOR SMALL CHILDREN FITTED WITH A DYNAMIC BACKREST (75) Inventor: Frederic Frans Petrus Gooris, Hong Kong (CN)

(73) Assignee: BOMBOL LIMITED, Hong Kong (HK)

( * ) Notice: Subject to any disclaimer, the term of this patent is extended or adjusted under 35 U.S.C. 154(b) by 594 days.

(21) Appl. No.: 13/498,375

(22) PCT Filed: Dec. 9, 2009

(86) PCT No.: PCT/IT2009/000555
§ 371 (c)(1),
(2), (4) Date: Mar. 27, 2012

(87) PCT Pub. No.: WO2011/051988
PCT Pub. Date: May 5, 2011

(65) Prior Publication Data
US 2012/0181830 A1    Jul. 19, 2012

(30) Foreign Application Priority Data

Oct. 28, 2009  (IT) .............................. MI2009A1869

(51) Int. Cl.
A47D 13/00      (2006.01)
A47D 13/10      (2006.01)
B62B 9/10       (2006.01)

(52) U.S. Cl.
CPC .............. *A47D 13/107* (2013.01); *B62B 9/108* (2013.01)

(58) Field of Classification Search
CPC .................................................. A47D 13/107
USPC ........... 297/452.13, 452.22, 452.56, DIG. 11; 5/98.1, 655
See application file for complete search history.

(56) References Cited

U.S. PATENT DOCUMENTS 2,127,710 A  *  8/1938  Baker ............................ 5/186.1
2,495,482 A  *  1/1950  Rogatz .......................... 297/467

(Continued)

FOREIGN PATENT DOCUMENTS

CN      1647723 A     8/2005
CN      201101324 Y   8/2008

(Continued)

OTHER PUBLICATIONS

International Search Report, dated Jul. 28, 2010, from corresponding PCT application.

(Continued)

*Primary Examiner* — Peter Brown
(74) *Attorney, Agent, or Firm* — Ella Cheong Hong Kong; Sam T. Yip (57) ABSTRACT A frame of a cradle for children, has a containing structure including a wall of flexible non-elastic fabric, shaped by cutting and stitching it to fit round a concavity that contains a backrest and a seat. The wall of the concavity opposite the backrest is made of an elasticized fabric, and is sewn along the edges of a window cut in the non-elastic fabric, obstructing it. The backrest and seat are cellular panels over which padded covers are placed. The cover over the backrest is sewn crosswise to the cover over the seat and to the non-elastic wall at the base of the window, so that the backrest, when loaded, is inclined relative to the seat. The non-elastic wall is turned back on three sides and sewn to a second elastic wall opposite the first to form a bag-shaped structure with an opening for flexible laminae of a cradle frame.

12 Claims, 10 Drawing Sheets

(56) References Cited

U.S. PATENT DOCUMENTS

| | | | | |
|---|---|---|---|---|
| 3,279,846 | A | * | 10/1966 | Morosini ............. 297/284.7 |
| 3,695,706 | A | * | 10/1972 | Basher et al. ......... 297/452.56 |
| 3,981,538 | A | * | 9/1976 | Chubb ............... 297/452.13 |
| 4,602,816 | A | * | 7/1986 | Chandler ............ 297/452.11 |
| 4,883,320 | A | * | 11/1989 | Izumida et al. ........ 297/452.56 |
| 5,308,143 | A | | 5/1994 | Cheng et al. |
| 5,360,258 | A | | 11/1994 | Alivizatos |
| 6,988,774 | B1 | * | 1/2006 | Elzenbeck ........... 297/452.56 |
| 7,118,177 | B2 | | 10/2006 | Piretti |
| 7,255,404 | B2 | * | 8/2007 | Neale ............... 297/452.56 |
| 7,484,811 | B2 | * | 2/2009 | Chang .............. 297/452.63 |
| 2011/0043011 | A1 | | 2/2011 | Ludeke et al. |

FOREIGN PATENT DOCUMENTS

| | | |
|---|---|---|
| CN | 101426406 A | 5/2009 |
| JP | 2006 122079 A | 5/2006 |
| JP | 2007159709 A | 6/2007 |

OTHER PUBLICATIONS

Chinese Office Action, dated Jun. 8, 2013, from corresponding CN application.

* cited by examiner

FIG. 1
KNOWN ART

CONTAINING STRUCTURE FOR SMALL CHILDREN FITTED WITH A DYNAMIC BACKREST

FIELD OF APPLICATION OF THE INVENTION

The present invention relates to the field of accessories for small children and, in particular, to a containing structure for small children fitted with a dynamic backrest. This structure can be mounted onto the bare frames of cradles, pushchairs and highchairs.

REVIEW OF THE KNOWN ART

Figure 1:
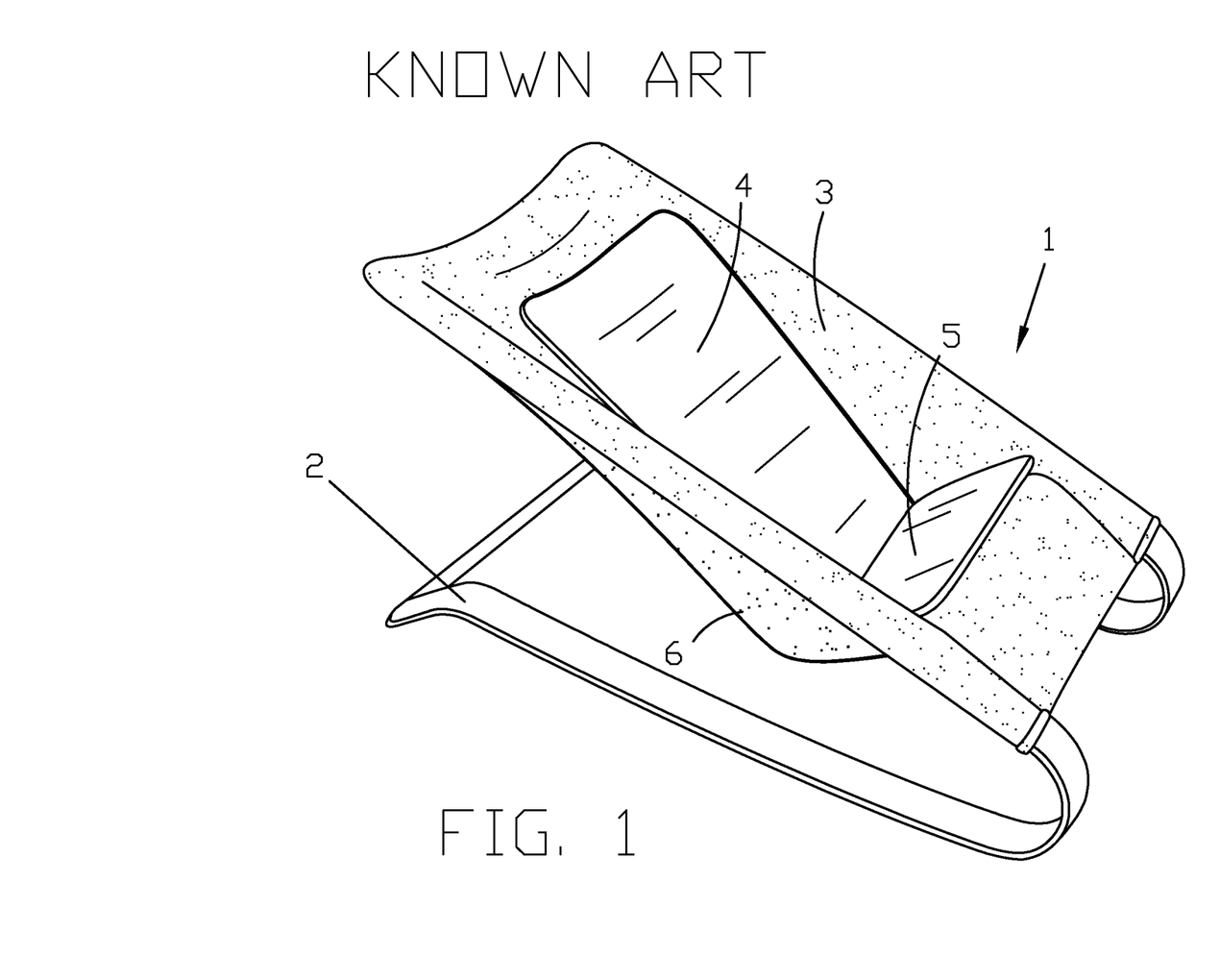
FIG. 1 shows a view in perspective of a cradle whose containing structure is realized in accordance with the known art.

As an example of the known art, FIG. 1 shows a cradle designed by the same applicant. It will be seen from the figure that the cradle 1 comprises a frame 2 of flexible upwardly-curving laminae, over which is fitted a containing structure 3 of stiff fabric shaped like a bag with a concavity at the front to receive the child. In the concavity is a backrest 4 and a seat 5 both of which are rigid and padded. To simplify the description, the safety elements that prevent the child from falling out are not shown. At the back of the cradle 1, there is a bag-shaped convexity 6 lying directly behind the convexity at the front. In this type of cradle, the sudden movements made by the child are completely absorbed by the elasticity of the frame so that no special padding is needed on the backrest or on the seat. The cradle 1 and the depth of the cavity formed on the front of the containing structure 3 are sized to take children of up to a certain weight. In the absence of suitable means (such as a backrest of adjustable inclination, or some other) it is reasonable to calculate the size of the cradle for a small child of average dimensions within the range of sizes envisaged for its use. The degree of inclination of the frame and the depth of the fabric bag that receives the child are calculated on these average dimensions. On this basis the average-sized child will be the most favoured as it will be supported by the most appropriate inclination and will rest against the backrest 4 neither too far inside the bag 6 nor too far out of it. The farther the child's dimensions depart from the average, the farther will backrest inclination and depth of penetration inside the bag depart from optimum levels. To overcome this drawback, present technique applies a rear strap (not shown) to the sides of the bag 6 lying crosswise to it and outside it. On adjusting the length of the strap by means of a buckle, inclination of the backrest remains unaltered even if the size of the child varies, as the depth of the bag will vary according to the length of the strap. But even by using a rear strap the drawbacks described cannot be overcome in a satisfactory manner. The strap can in fact only reduce the depth of the bag starting from maximum capacity; the bag must therefore be designed for the largest child instead of for one of average size, and this involves a surplus of fabric. Alternatively, cradles would have to be built to suit different sizes. Further, the strap that supports the bag at the rear relieves its edges of the child's weight but increases the load on the strip for contact between strap and bag; this involves concentrating strain on the seams at both ends of the strap, which in time might give way, and extra padding on the backrest to lessen pressure on the central strip.

SUMMARY OF THE INVENTION

Purpose of the present invention is therefore to overcome the drawbacks referred to above.

To achieve this, subject of the invention is a containing structure comprising:
at least one non-extensible wall made of fabric or of non-woven fabric, shaped to form a concavity to receive a child;
a backrest;
means for fixing the non-extensible wall to frame-type supporting means;
and further, according to the invention:
a window cut in the non-extensible wall at the position of the backrest;
a wall made of extensible material elastically connected to the edges of said window;
means for connecting the backrest to said non-extensible wall in such a way that the backrest can be inclined against the extensible wall, as described in claim 1.

The invention can be applied with advantage to the frame of cradles for small children, to pushchairs and to similar articles for infant use. Further characteristics of the present invention considered as innovative are described in the dependent claims.

In one preferred form of its realization, said connections are seams.

In one realizable form the backrest is a rigid panel over which an internally padded cover is placed, the cover being sewn onto the first wall at the base of the window so that the backrest is pivotal round the seam.

According to the invention said concavity includes a part for seating the child adjacent to the backrest onto which a seat is fitted, said seat consisting of a rigid panel inside an internally padded cover.

According to the invention, the covers for the backrest and for the seat are sewn together along a respective crosswise edge, also sewn to the non-extensible wall in such a way that both backrest and seat can be turned back over the seam.

In one realizable form the containing structure includes T-shaped means for keeping the child safe, said means made to fit between the child's legs, hereinafter called a leg-divider, together with means for fixing it comprising first buckle elements sewn onto the non-extensible wall close to each side of the base of the backrest, to clip into second buckle elements, complementary to the first, sewn at the ends of the leg-divider arms.

According to the invention the containing structure also includes
T-shaped safety means serving as a leg-divider for attachment to the non-extensible wall;
first buckle elements joined laterally, in relation to the base of the backrest, to the non-extensible wall, behind the arms of the leg-divider facing towards the backrest;
second buckle elements complementary to the first, joined to the ends of the leg-divider's arms;
pads, each sewn to its respective side of the non-extensible wall, facing inwards with one face opposite the backrest and the other face in contact with the first buckle elements, the border round the pads including the border round the buckle parts when closed, to avoid any direct contact between the child's skin and the buckle elements.

According to the invention the ends of said arms comprise a padded pocket inside which the second buckle elements are fixed; said elements emerge from the pocket without exceeding the hem of the pocket, said hem lying underneath the second buckle elements.

In one realizable form said containing structure comprises a strap extending over the rear of said elastically extensible wall, crosswise to it, the two ends of the strap being connected to the non-extensible wall so that the length of the strap can be adjusted.

In one realizable form the containing structure is shaped like a bag to be fitted over the frame; the front wall of the bag comprises said elastically extensible wall, while the rear wall of the bag, at least at the position of the elastically extensible wall at the front, comprises a second wall made of the same elastically extensible material.

According to one aspect of the invention, the second wall of extensible material comprises nearly all the rear wall of the bag with the exception of a margin from the sewn edges.

Advantages of the Invention

In relation to the containing structure used in the cradle seen in FIG. 1 and in similar cradles or pushchairs even those fitted with a supporting strap, its great advantage is that of self-adjustment of backrest inclination to the most suitable degree irrespective of the weight of the seated child. A strap at the rear to support the bag at the front concavity is therefore not required, at least as regards its usual purpose of adjusting inclination of the backrest. This does not however mean eliminating the rear strap, perhaps still useful for adjusting backrest inclination when, even if not the best when lying flat, it is sometimes the position preferred by the child who wants to sit up and play.

The extensible wall supports the movements made by the child, always enabling it to be accommodated in the ideal position. The discomfort due to remaining in an incorrect position for too long, is therefore avoided. In view of the foregoing, a cradle based on the containing structure, subject of the present invention, may advantageously be used in pediatrics.

Finally, the series of lateral pads and well-padded pockets hold the T-shaped leg-divider in position avoiding direct contact between the child's skin and the straps or buckles.

SHORT DESCRIPTION OF THE FIGURES

Further purposes and advantages of the present invention will be made clear by the following detailed description of an example of its realization, and by the attached drawings provided solely for explanatory purposes and in no way limitative, wherein.

DETAILED DESCRIPTION OF SOME PREFERRED WAYS OF REALIZING THE INVENTION

In the following description identical parts that appear in different figures may be indicated by the same symbols. In describing a figure reference may be made to parts not expressly indicated in that figure, but in previous figures. The scales and proportions of the various parts shown are not necessarily those of real ones.

Figure 2:
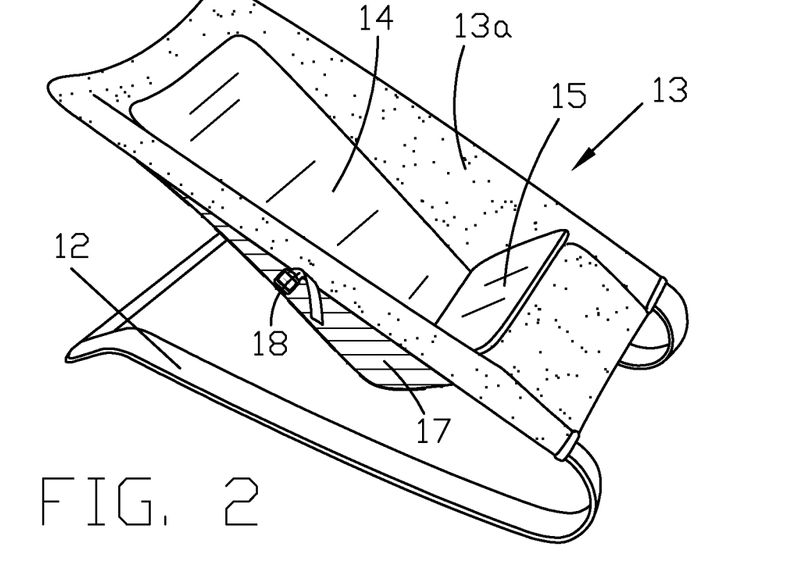
FIG. 2 shows a view in perspective of a cradle that differs from that seen in FIG. 1, its containing structure being made according to the present invention, here seen unloaded.

FIG. 2 shows a cradle the shape of which is similar to that in FIG. 1 but differs as regards the containing structure, the difference being better seen in the next figure. The cradle in FIG. 2 comprises a frame 12 of flexible upwardly-curving laminae over which a containing structure 13 is placed. The structure 13 comprises a bag-shaped wall 13a of non-elastic flexible fabric, with a concavity in front to receive the child. A backrest 14 and a seat 15, both rigid and padded, are placed in the concavity. To simplify the description, the safety parts provided to hold the child in place have been omitted. At the rear of the cradle the bag-shaped convexity 17 may be seen at the position of the concavity in front. One end of a strap 18, with buckle, is visible below the bag 17 and to one side of it. The drawing indicates the difference between the material used to make the bag 17 compared with that used for the wall 13a. The rear bag 17 is made of elastically extensible material, the elongation of which, seen in the figure, corresponds to its position when idle and without load.

Figure 3:
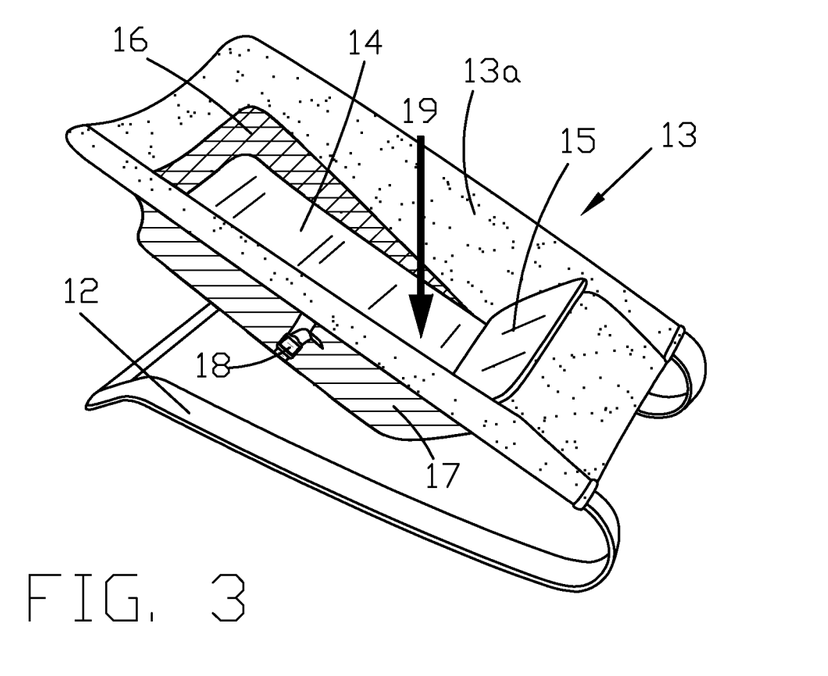
FIG. 3 shows a different configuration due to the presence of a load.

FIG. 3 shows the configuration of the bag 17 when a load, schematically represented by the thick arrow 19, weighs on the backrest 14. It will be seen that the bag 17 tends to drop because of its elasticity and that the backrest 14 is slightly rotated as a consequence, showing up a second elastically extensible wall 16 at the front, hidden by the backrest 14 in the preceding figure. The two elastic walls, 16 and 17, deform together because they match at the two sides of the containing structure 13. The configuration shown in FIG. 3 represents the maximum elastic extension of the bag 17 allowed by the design and, in this case, the rear strap 18 serves to prevent the maximum drop level from being accidentally exceeded, although its presence may not be strictly necessary. The dimensions and position of the elastic walls 16 and 17, both one to another and in relation to the non-elastic wall 13a, will be made clearer in the next figures. It is worth mentioning here that the seat 15 rests on a band of non-elastic fabric so that its inclination remains practically the same.

As stated in the introduction, inclination of the backrest 14 adjusts itself to the best position without needing to use the strap 18. This can be immediately guessed from a comparison between the two figures: if the front wall 16 in FIG. 3 were not elastically extensible, a part of the child's body might mostly lie outside the bag 16,17, and inclination of the backrest 14, in relation to the seat 15, might therefore be unsatisfactory. Without any such assumption of wall 16 not being elastically extensible, FIG. 3 shows that the same weight has stretched the bag 16, 17 downward so that the child is now more fully contained inside it and inclination of the backrest 14 in relation to the seat 15 has consequently reached an optimum position as seen in FIG. 3. In this case use of the strap is only precautionary to ensure that downward elongation of the bag 17 does not exceed the maximum allowed by the design of the frame. As said above, if the child prefers an inclination of the backrest 14 not considered as optimum, the strap 18 can be shortened to lessen it.

As regards its manufacture:

- The two elastically extensible walls 16, 17 are made of a fabric consisting of 89% polyester fibres (micro-polyesters) and 11% Elastan (polyurethane fibres). The characteristics of elastic expansion so obtained are in excess of what is actually required.
- The rest of the containing structure 13 is made of a fabric consisting of 100% polyester fibres; a non-woven material, such as leather or any other, may be used so long as it is flexible but not elastic;
- The backrest 14 and seat 15 each consist of a rigid plastic panel of a cellular structure over which a cover is fitted of the same non-elastic material as the containing structure 13, padded with polyester wool to a thickness of about 25 millimeters.

Figure 4:
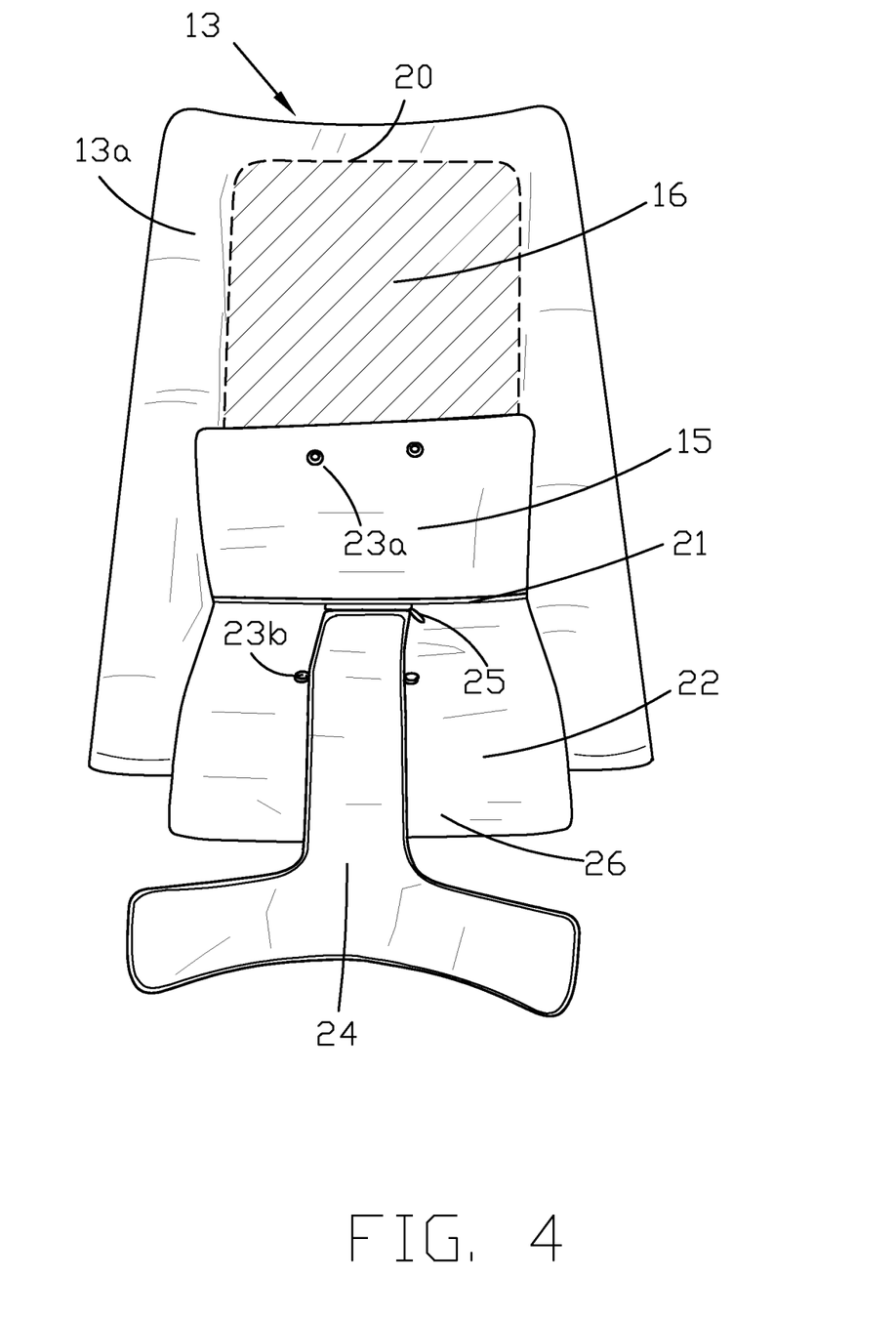
FIG. 4 shows a front view of the containing structure used in the cradle seen in FIG. 2, here with seat and leg-divider turned back.

FIG. 4 shows the front of the containing structure 13 without the frame 12 and backrest 14. Seen from the front its form is somewhat similar to an isosceles trapezium with oblique sides only slightly inclined. A window has been cut in the upper part of the non-elastic fabric 13a, said window extends downwards for about half the length of the structure 13 and is sewn on three sides to the wall of elastic fabric 16 by a seam 20, allowing a suitable margin from the edge of the structure 13. The figure shows the seat 15 turned back over a crosswise seam 21 sewn to the non-elastic fabric of the wall 22 underneath. On the underside of the seat 15 there are two buttons 23a that snap into respective buttons 23b on the underlying wall 22, one on each side of the longitudinal arm of a T-shaped leg-divider element 24 shown when turned back. The base of the T is joined to the wall 22 by a short zip 25 adjacent to the centre of the seam 21. The flexible non-elastic fabric, visible in the front of the structure 13, is folded back at 180° above the elastic wall 16 and at the sides of wall 16 and of wall 22, continuing at the rear with margins of a precise width, and ending at the bottom in a lip 26 of the wall 22. The lip 26 lies at the entrance to the bag formed by the two front and rear walls of the containing structure 13, sewn together along the margins. The bag structure can be fitted onto a frame suited to the purpose, such as that formed by the flexible laminae in FIG. 2, for example.

Figure 5:
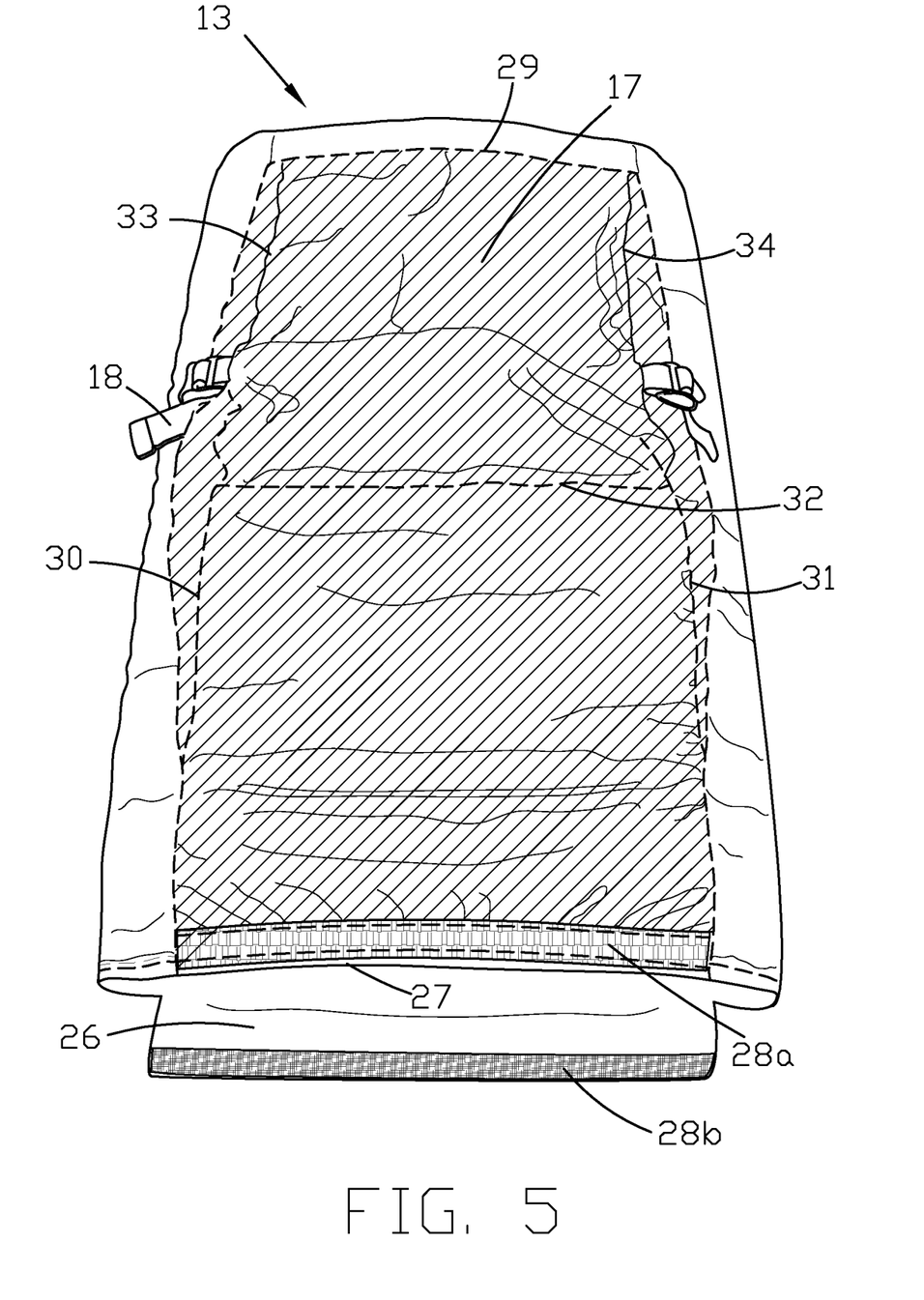
FIG. 5 gives a rear view of the containing structure for the cradle in FIG. 2.

FIG. 5 shows a rear view of the containing structure 13 without the frame 12. From the figure it will be seen that the non-elastic fabric on the front is turned back underneath, both uppermost and at the two sides, terminating at the bottom with a hem 27 just above the lip 26 of the wall 22 at the front. A strip of Velcro 28a is sewn onto the hem 27 to match with a strip of Velcro 28b sewn onto the back of the lip 26. Once the structure 13 is fitted onto the frame, the lip 26 is turned 180° inwards around a crosswise lamina and the two strips of Velcro match up. The turned back edges of the front wall 22 extend only a short way inside the structure because the rear side is almost entirely occupied by the elastic wall 17 that terminates at the hem 27 to which it is sewn together with the strip of Velcro 28a. The figure shows a series of folds and seams that serve to make the rear wall similar to a bag. To be specific, on the rear side there are: (a) a seam 29 that surrounds the elastic wall 27 on three sides; (b) two more lateral seams, 30 and 31, a little further inside; (c) these latter seams are joined by a crosswise seam 32 at the position occupied by the seat 15 on the front; (d) two folds, 33 and 34, on the upper continuation of seams 30 and 31.

Two buckles to adjust the length of the strap 18 are attached to the non-elastic fabric at the two sides of the elastic wall 17. In this latter, at the position of the buckles, there are two slots through which the strap 18 passes, in this way coming in contact with the front elastic wall 16.

Figure 6:
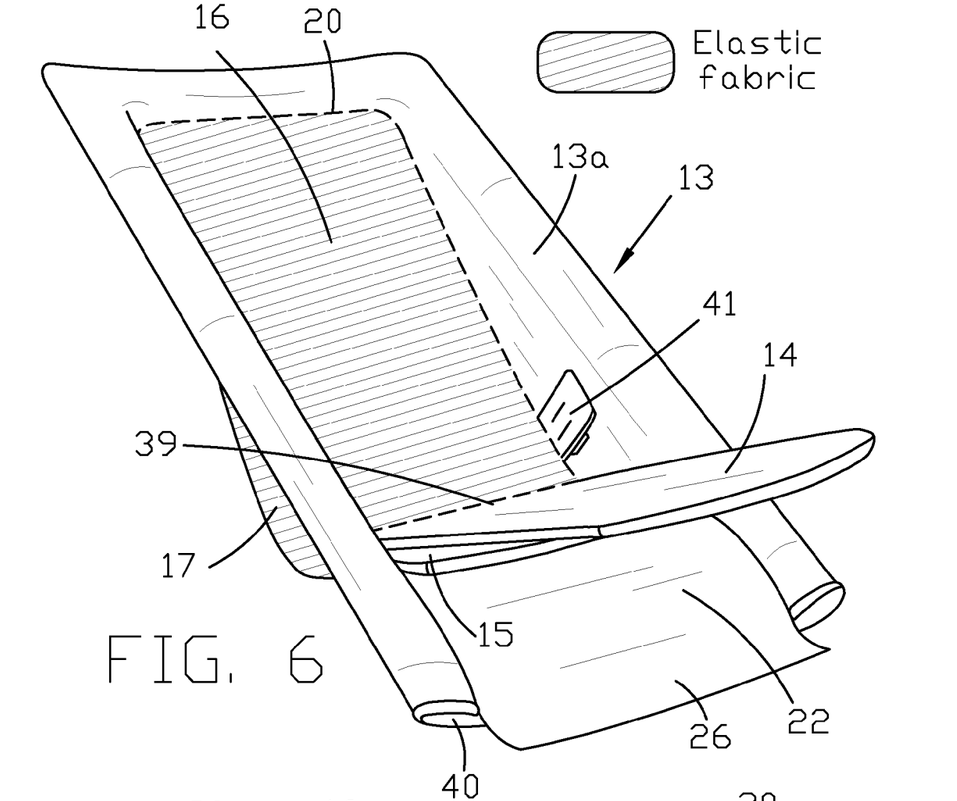
FIG. 6 is a view in perspective of the containing structure for the cradle in FIG. 2, with the backrest turned back.

FIG. 6 shows a view in perspective of the containing structure 13 in FIG. 4, with the backrest 14 turned forward over the seat 15, without the leg-divider 24. While seen from the front in FIG. 4 the wall of non-elastic fabric 13a seemed flat, in the perspective view it will be seen that the marginal sections at the two sides of the seam 20 delimit, with the elastic wall 16, a concavity that corresponds with the bag formed at the rear by the elastic wall 17. The figure shows a crosswise seam 39 between the cover of the backrest 14 and the base of the front elastic wall 16. The opening 40 to the bag 13, can just be seen below the exceeding lip 26. Two pads, of which the only one visible is numbered 41, are sewn on at the two sides of the elastic wall 16 close to the seat 15.

Figure 7:
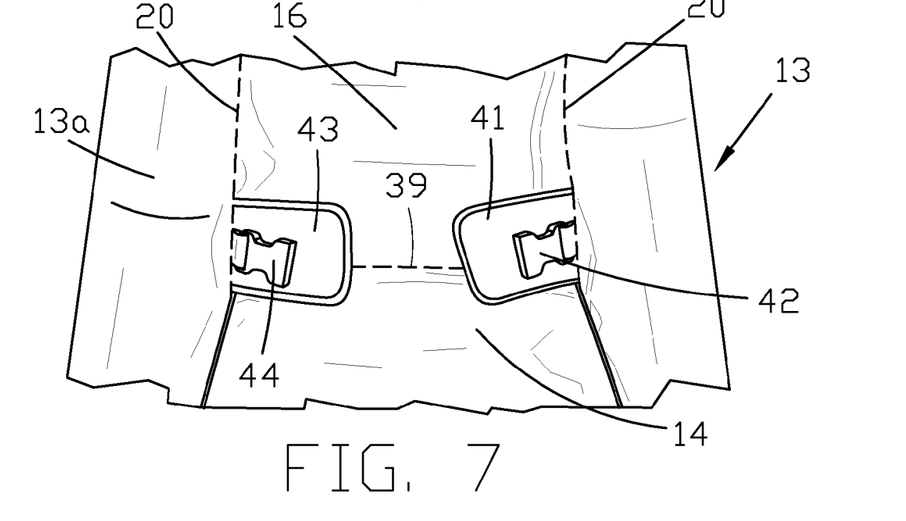
FIG. 7 shows a detail of the lateral pads with safety buckles to fix the two arms of the T-shaped leg-divider visible in FIG. 4.

FIG. 7 shows the pad 41 and its opposite 43 sewn on as described above. These pads, 41 and 43, are rectangular in shape with rounded corners and lie crosswise one towards the other. At the same position as pads 41 and 43, two short lengths of strap are sewed onto two buckles 42 and 44. Buckles 42 and 44 are opposite to the front surface of pads 41 and 43. When the backrest 14 is not turned back, the pads and buckles lie between the backrest 14 and the seat 15 to fix the two arms of the leg-divider 24. The surface of the front face of each pad extends beyond the surface occupied by the opposing buckle. This means that connection by means of the buckle and a short piece of strap remains entirely within the border of the opposite face. In this way direct contact is avoided between the buckles 42 and 44 and the skin of the child seated in the containing structure 13. Buckles 42 and 44, like those used to fix the ends of the rear strap 18, are "Brunner" polypropylene buckles normally used on backpacks as well as on many other articles: they consist of two complementary parts, female (like 42 and 44) and male. The type of buckle used in no way limits the invention.

Figure 8:
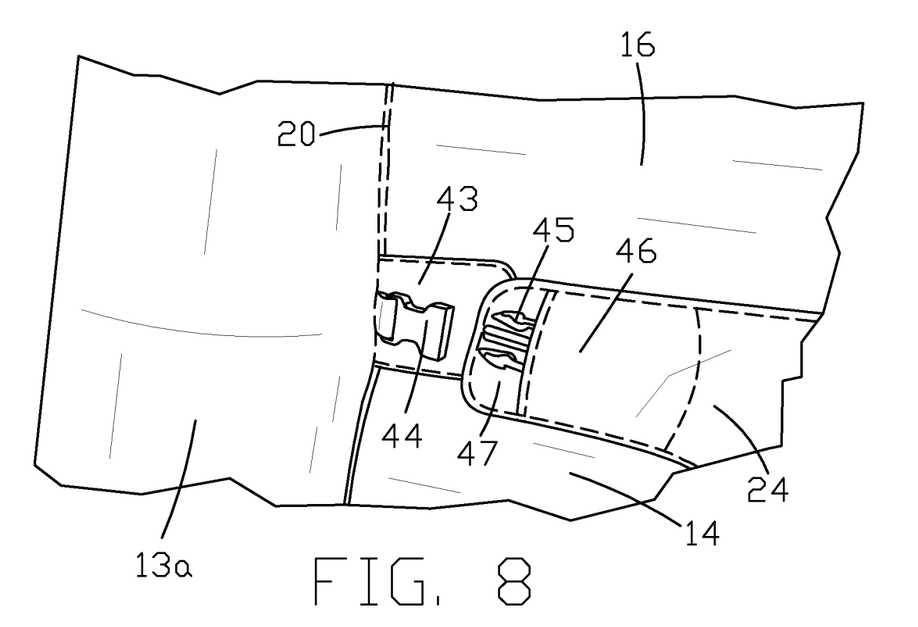
FIGS. 8 and 9 show in sequence two stages of fixing one arm of the leg-divider with a strap and buckle visible in FIG. 7.

FIG. 8 shows the buckle 44 on the left pad 43 just ready to fit onto a complementary buckle 45 sewn onto the end of the left arm of the T-leg divider 24. As seen in the figure, the buckle 45 partly projects from a pocket 46 at the end of said arm. The hem of pocket 46 lies short of the end of the arm leaving free a margin 47 of an inner face beyond which the emerging buckle 45 does not pass. Margin 47 faces the opposite way in relation to buckle 44. This precautionary measure prevents direct contact between the complementary buckle 45 (and its other half not shown in the figure) and the skin of the child sitting in the containing structure 13.

Figure 9:
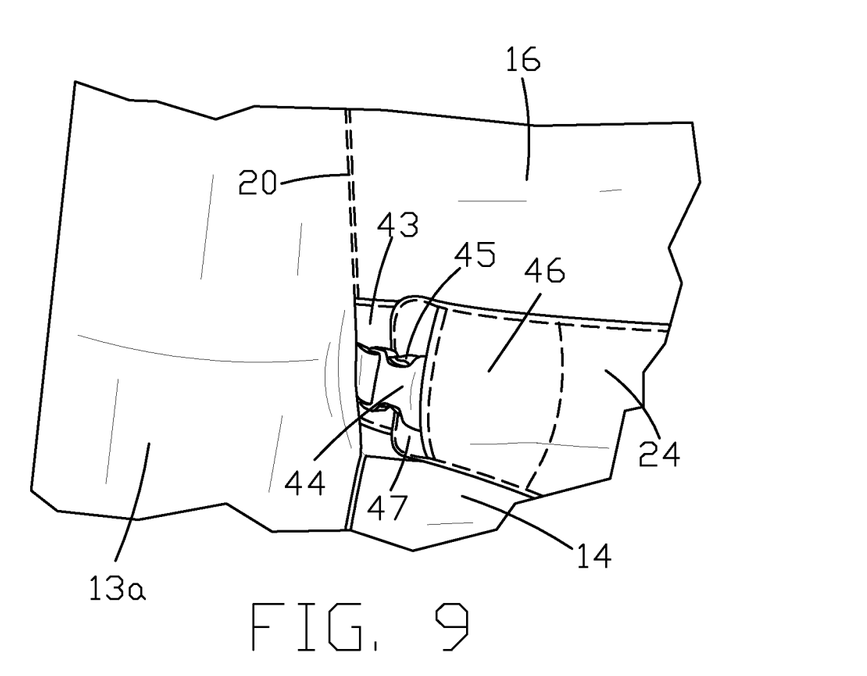

FIG. 9 shows the buckle 44 closed with its complementary component 45. As may be seen in the figure, when the buckle is closed the margin 47 lies over the pad 43 pressing inwards under the buckle 44 so that the child's skin is protected by a double thickness that isolates it from contact with each buckle.

Figure 10:
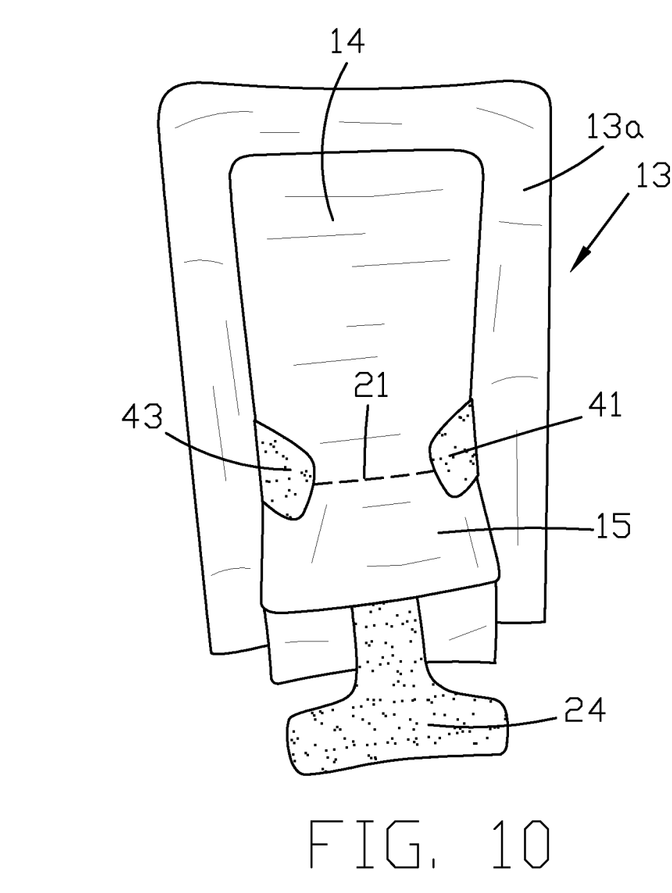
FIGS. 10 and 11 show the configuration of the leg-divider with that of the two lateral pads seen in FIG. 7 during the sequences seen in FIGS. 8 and 9.
Figure 11:
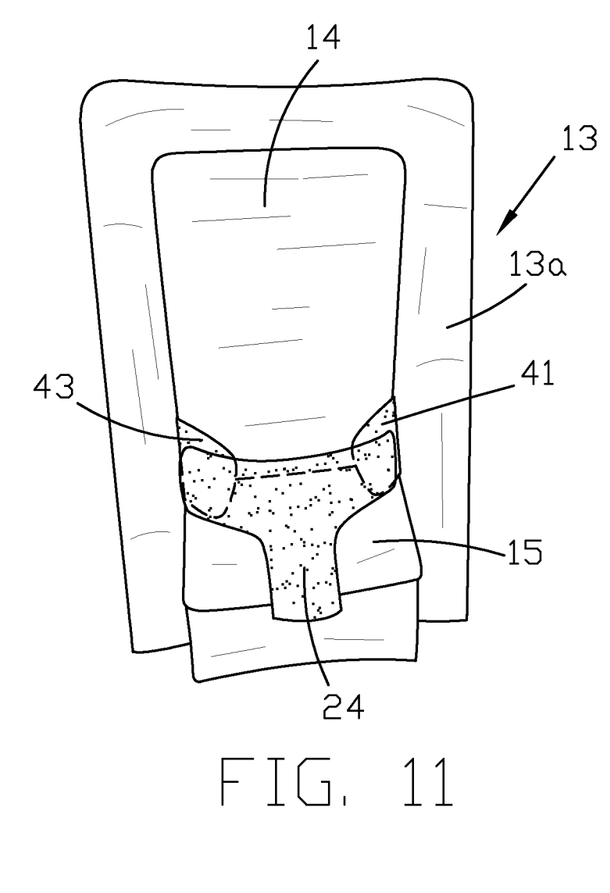

FIGS. 10 and 11 schematize the functions of the protective pads and pockets, further characterizing the means with which the containing structure 13 is provided for holding the child safely. FIG. 10 shows the structure 13 in an initial configuration with the leg-divider 24 completely turned back. Also shown is the lateral position of the pads 41 and 43 extending over the seam 21 between the backrest 14 and the seat 15. FIG. 11 clearly shows how the ends of the two arms of the leg-divider 24 lie over the respective pads 41 and 43 in the area where the buckles are used.

Figure 12:
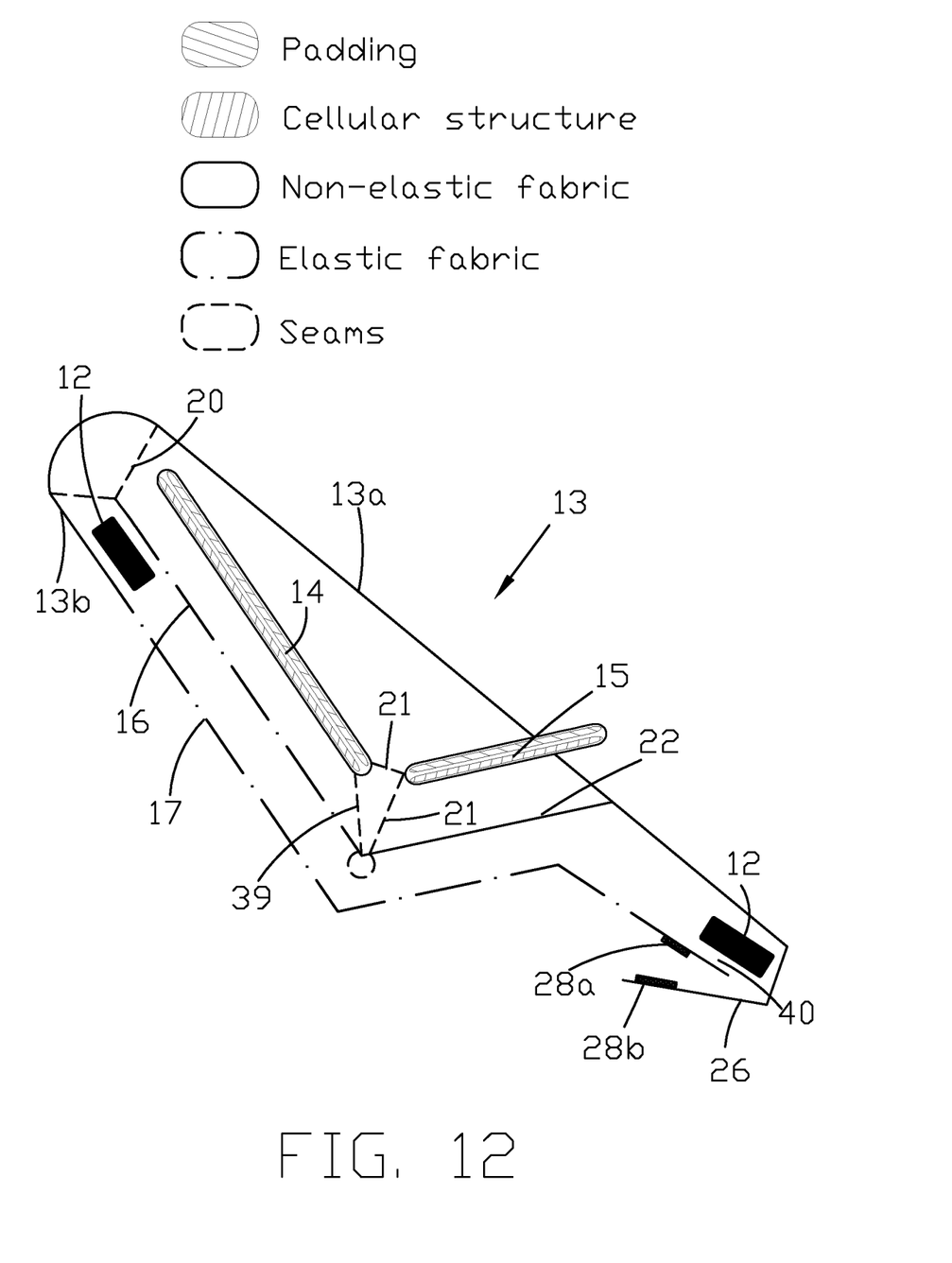
FIG. 12 is an exploded view of one section, along a longitudinal plane of symmetry, of the containing structure in FIG. 2.

The exploded view in FIG. 12 schematizes a longitudinal section of the elastic and non-elastic walls with their seams and folds that form the containing structure 13. This structure is obviously shown irrespective of whether there is a load or not; all that changes with a load is the spatial layout of the various elements in relation to each other. The configuration seen in the figure is the one without a load; the variations brought about by a load will be shown subsequently. When unloaded, the elastic walls 16 and 17 are pressed down to an insignificant degree by the weight of the cellular-type backrest 14 alone. The containing structure 13 in FIG. 12 has a front and a rear side, both consisting of flexible non-elastic fabric walls and of flexible elastic fabric walls. Alternatively, the non-elastic walls can be made of non-woven fabric. Wall thickness is that of the usual fabrics for seats. All joins between walls are made by seams. In addition to the walls, the structure 13 comprises a backrest 14 and a seat 15 made as indicated by the Legend to FIG. 12. The presence of a seat 15 is advantageous but not essential as it could be replaced by extra padding in the wall 22 on which it rests. This is not possible for the backrest 14 that interacts with the elastic walls underneath. Wall 13a of non-elastic fabric is inclined, in relation to a horizontal plane, to the same degree as the frame of the cradle in FIG. 2; to suit other cases the inclination could be increased or lessened. The wall 13a extends along the front from the opening in the bag at the lower lip 26 as far as the upper margin; from there it continues at the rear for a length 13b that extends on the three sides as far as the edges of the lower elastic wall 17. At the front, wall 13a laterally delimits wall 22 of non-elastic fabric, placed where the child is expected to sit, to support the seat 15. Again frontward, the elastic wall 16 lies where the child will rest its back, to give better support to the backrest 14. The two walls, 16 and 22, are obviously contiguous and are differently inclined in the unloaded position; in the same way walls 16 and 13a are also differently inclined to form a concavity with the apex lying at the conjunction between the seat and the backrest. The figure shows the seam 20 between wall 13a and elastic wall 16, frontward, and between the edge 13b and the elastic wall 17 rearward. Seams 39 and 21 are also visible frontward. The cover of backrest 14 is sewn, rearward, to the elastic wall 16 by the crosswise seam 39 and, frontward, to the cover for the seat 15 by a seam 21 to the wall 22. The figure shows the bag-shaped configuration of the structure 13 where the crosswise laminae of the frame 12 (not part of the invention) can be seen inside. The lower lip 26, turned back around the lower lamina, is closed by strips of Velcro 28a and 28b.

The seam 21 enables the backrest 14 to pivot in relation to the wall underlying 22 on which the seat 15 rests; the seat 15 pivots in the same way. Rotation of the backrest 14 caused by the weight of the child, generates pressure on the surface of the elastic wall 16 which is thereby lowered so increasing the volume of the front concavity. The rear wall 17, pressed by the matching wall 16, becomes similarly deformed. When the child is picked up from the cradle, the two elastic walls, 16 and 17, return to their original shape and the backrest 14 is rotated in the opposite direction.

Though not expressly shown in the figure, it should be said that inside the bag formed by the structure 13, straps fitted with buckles are fixed round the laminae of the frame 12 at a short distance from the aperture 40.

Figure 13:
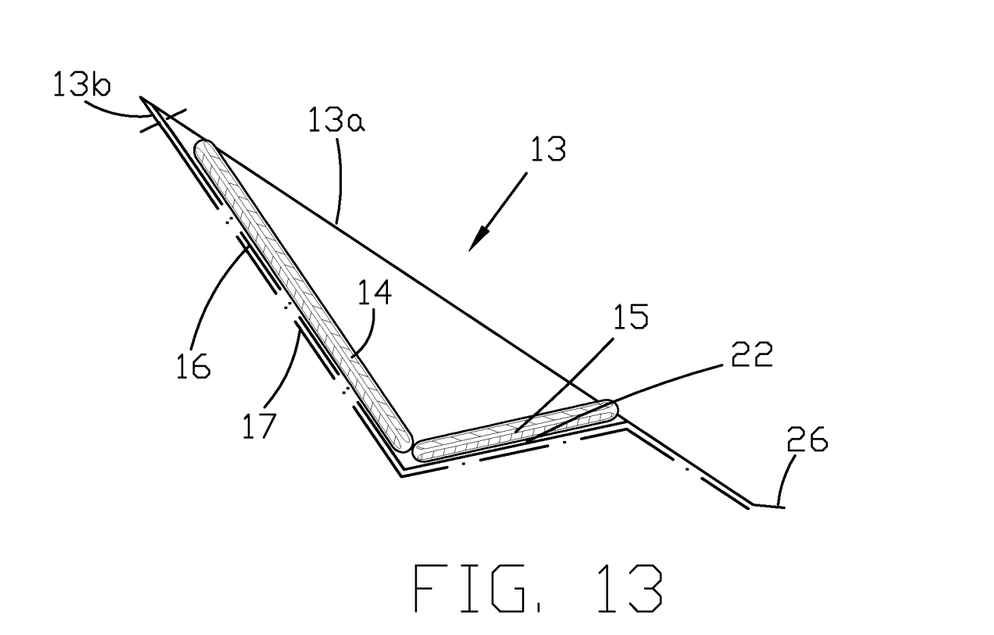
FIG. 13 shows the configuration of FIG. 8 in an ordinary view.

FIG. 13 adds little of importance to FIG. 12 apart from showing the two elastic walls, 16 and 17, matched together.

Figure 14:
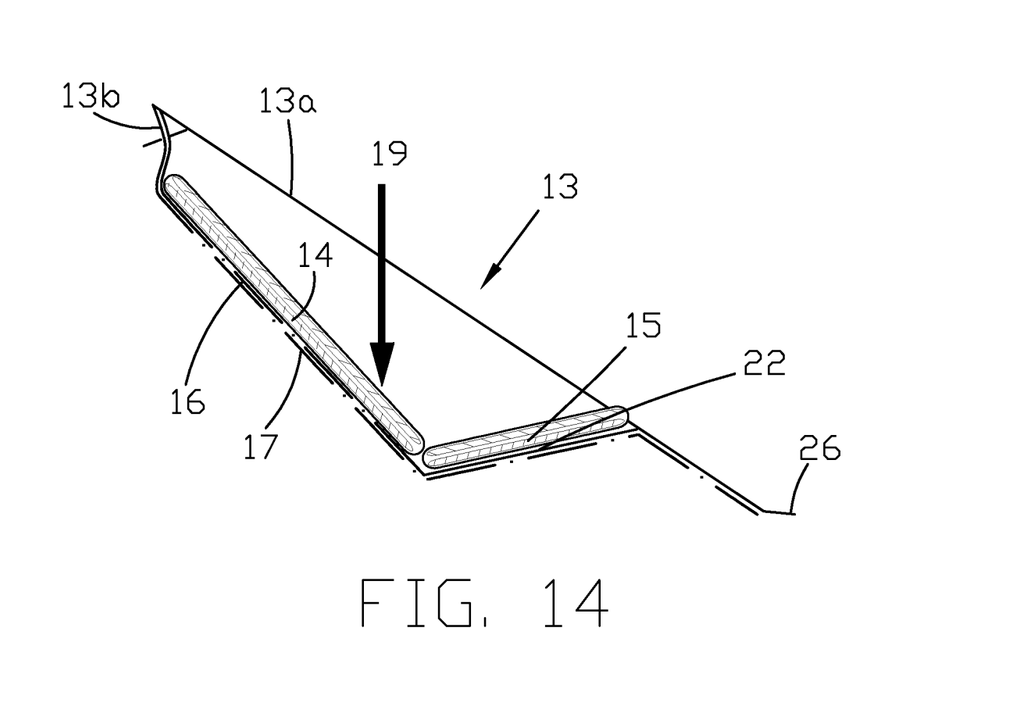
FIG. 14 differs from the FIG. 13 configuration by the presence of a load.

FIG. 14 shows the new configuration assumed by the containing structure 13 when a load 19 (the weight of the child) weighs on both the seat 15 and the backrest 14. From a comparison between FIGS. 14 and 13 it will be seen that inclination of the seat 22 remains practically unaltered while that of the backrest 14 increases by about 10° and automatically adapts to the new situation. Simultaneously with the greater inclination of backrest 14, the volume of the bag, formed by matching elastic walls 16 and 17, increases due to the greater surface so acquired.

Figure 15:
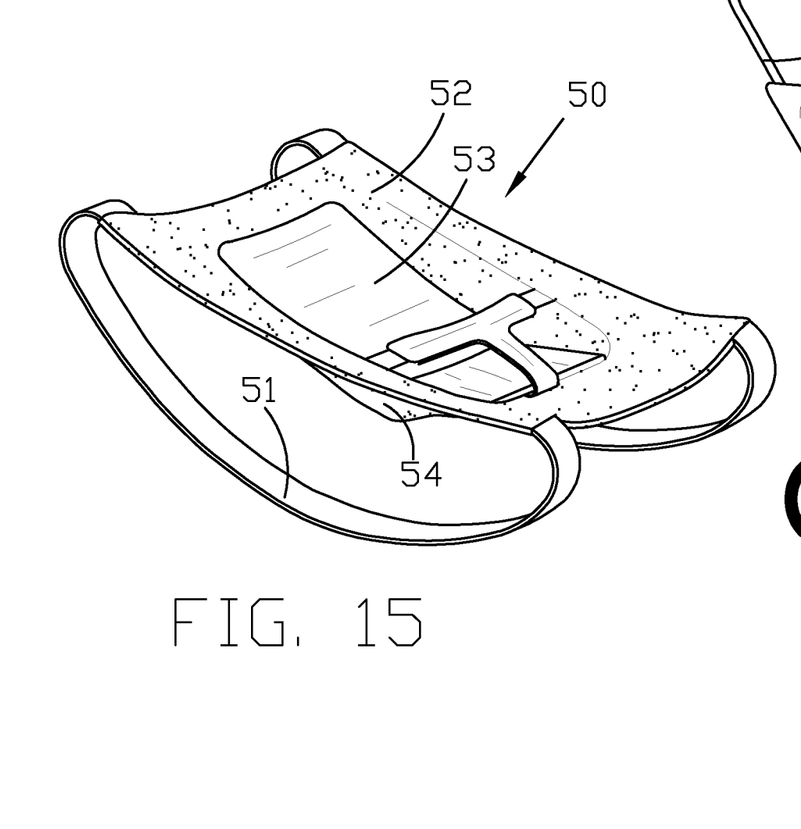
FIG. 15 shows a view in perspective of a rocker-cradle where the containing structure of the present invention has been used.

FIG. 15 shows a containing structure 50 that differs from the structure 13 in that it is not bag-shaped. For this reason it is suitable for application to frames fitted with tubular or lamina supports 51 closed ringwise, or the like, in other words, frames over which a cover cannot be placed. The containing structure 50 comprises a wall 52 of non-elastically extensible fabric in which a window has been cut to whose sides an elastically extensible wall (not shown) has been sewn. Wall 52 differs from wall 13a in that it is open at both upper and lower base. Two variants can be realized; in accordance with a first variant, the containing structure 50 comprises:
- two flaps turned under the sides of the non-extensible wall 52, at right angles to the crosswise seam around which the backrest 53 pivots;
- a second wall 54 of elastically extensible material sewn on one side to one of said flaps so as to obtain a structure to place round the laminae of the frame 51;
- fixing means of known type connected to the turned back unsewn edge.

On its front and rear sides, therefore, the containing structure 50 has two opposite windows the hems of which are sewn to the edges of two respective elastic walls.

In accordance with a second variant, the wall 52 extends onto the rear side by only two flaps around the laminae 51, fixed in place by known means. In this case wall 52 has only one window for sewing to a single elastic wall.

Figure 16:
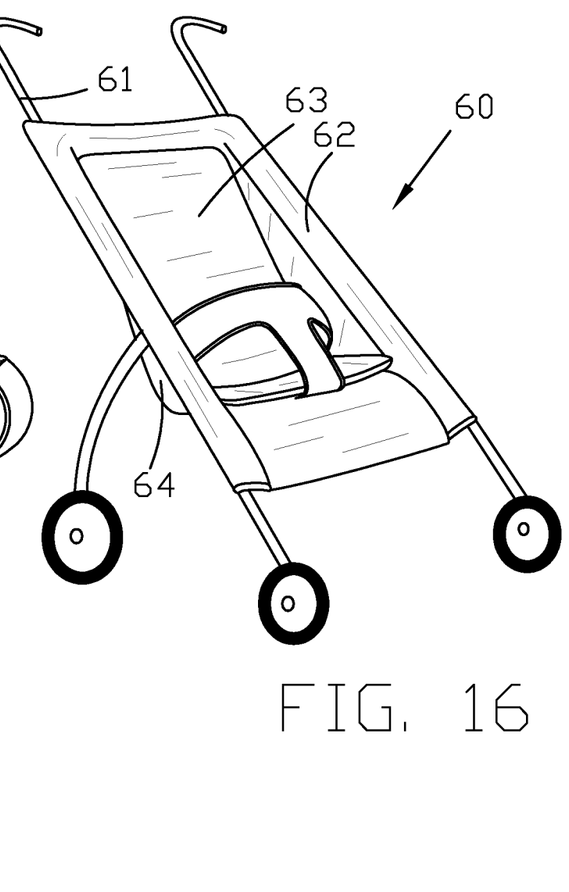
FIG. 16 shows a view in perspective of a pushchair where the containing structure of the present invention has been used.

FIG. 16 shows a containing structure 60 for a pushchair similar to the second variant of wall 50 in FIG. 15. The structure 60 is mounted on the pushchair's frame 61 and is more upright than the containing structure 13; it presents a backrest 63 that pivots against a wall of elastic material 64 forming a bag.

Based on this description of a preferred example of its realization, some changes can obviously be made to the invention by experts in the field without thereby departing from its sphere of application as will appear from the following claims.

The invention claimed is:

1. Containing structure (13) comprising:
   at least one wall (13a) of fabric or non-woven fabric, non-extensible and shaped so as to form a recess to receive a small child;
   a backrest (14);
   means for fixing the non-extensible wall (13a) to frame-type supporting means (12, 51, 61)
   characterized in that it also includes:
   a window made in the non-extensible wall at the position of the backrest (14);
   a wall made of elastically extensible material (16) connected (20) to the edges of said window;
   means for joining (39) the backrest to said non-extensible wall (13a) so that the backrest (14) is included against the extensible wall (16);
   the backrest (14) comprises a rigid panel inside a fully padded cover, the cover being sewn to said non-extensible wall (13a) at the base of said window, so that the backrest (14) is pivotal around the means for joining (39).

2. Structure as in claim 1, characterized in that:
the wall made of elastically extensible material (16) being connected (20) to the edges of said window by seams;
the means for joining (39) the backrest to said non-extensible wall (13a) being seams.

3. Structure as in claim 2, characterized in that said means for fixing the non-extensible wall (52) to said frame-type supporting means (51), include a further wall opposition the two previous walls, said further wall including:
two side flaps of the non-extensible wall (52) orthogonal to the seam on the backrest (53);
a second wall (54) made of elastically extensible material sewn on one side to one of said flaps to obtain a wrapping structure on said frame-type supporting means (51);
holding means of a well-known type connected to the turned-back edges not sewn.

4. Structure as in claim 1, characterized in that said recess includes a seating area (22) for the child adjacent to the backrest (14) onto which is mounted a seat (15) consisting of a rigid panel inside a fully padded cover.

5. Structure as in claim 4, characterized in that the cover of the backrest (14) and of the seat (15) are sewn together (21) along a respective crosswise edge, also sewn to the non-extensible wall (13a) so that the backrest and the seat can both be folded back around a common crosswise seam (21).

6. Structure as in claim 1, characterized in that it includes:
means for a T-shaped safety leg-separator (24) applicable to the non-extensible wall (13a);
first buckle parts connected to the non-extensible wall (13a) in a sideways position in relation to the base of the backrest (14), behind the arms of the leg-separator means (24), facing towards the backrest;
second buckle parts (45), complementary to the first, connected to the ends of the two arms of the leg-separator means (24);
pads (41, 43) sewn onto the respective sides of the non-extensible wall (13a), facing towards the inside with one face opposite the backrest (14) and the other face in contact with the first parts (42, 44) of the buckle, the border round the pads including the border round the buckle parts when closed, so as to avoid any direct contact between the child's skin and the buckle parts.

7. Structure as in claim 6, characterized in that the ends of said arms include a padded pocket (46) inside which are fixed the second buckle parts (45), that project from the pocket remain within a border (47) beyond the hem of the pocket, said border lying under the second buckle parts (45).

8. Structure as in claim 1, characterized in that said fixing means of the non-extensible wall (13a) to said frame-type supporting means, include a further wall opposite two preceding walls, which in turn includes:
two flaps (13a) of the sides of the non-extensible wall orthogonal to the seam (39) of the backrest (14);
one flap (13b) on the side of the non-extensible wall (13a) parallel to the seam (39) of the backrest and on the side of said window;
a second wall (17) made of elastically extensible material, sewn on the three sides (29) to said flaps (13a, 13b) thus obtaining a sack-like structure to fit onto the two frame-type supporting means (12).

9. Structure as in claim 8, characterized in that the non-extensible wall (13a) is longer than said further wall by a lip (26) that can be turned back, fitted with a fixing element (28b) connectable to a complementary element (28a) placed on the free edge of said further wall.

10. Structure as in claim 1, characterized in that said means for fixing the non-extensible wall (52, 62) to said frame-type supporting means (51, 61) include:
two flaps of the sides of said non-extensible wall orthogonal to the means for joining the backrest (53, 63) to said non-extensible wall;
holding means of a well-known type connected to the turned back edges.

11. Structure as in claim 1, characterized in that it further includes a strap (18) extending at a rear side of said elastically extensible wall (16) and crosswise to it, a first end and a second end of the strap being joined to the non-extensible wall (13a) so that the length of the strap can be adjusted.

12. Structure as in claim 1, characterized in that it is applicable to the frame of a cradle, a pushchair or similar articles for small children.

* * * * *